J. Miller,
Sawing Stone.

Nº 14,729.            Patented Apr. 22, 1856.

UNITED STATES PATENT OFFICE.

JAMES MILLER, OF BUFFALO, NEW YORK.

MACHINE FOR SAWING MARBLE IN OBELISK FORM.

Specification of Letters Patent No. 14,729, dated April 22, 1856.

*To all whom it may concern:*

Be it known that I, JAMES MILLER, of the city of Buffalo, in the county of Erie and State of New York, have invented a new and Improved Mode of Machinery for Sawing Stone, Marble, or Wood on Two Sides at the Same Time in an Angular Form; and the nature of my invention consists in working two saw sashes in two movable or adjustable frames or guides, on each end of which frame or guide a rocking bar is secured or pivoted so as to allow it to vibrate, to the upper end of which rocking bar the power is applied and by it transmitted to the lower, to the lower end of which is connected the saw sash, so that the power is applied to the saw sash in the line with the working of the saw at whatever angle the frame or guide may be set, and also in securing the saw sash in the saw frame between guides or rollers which will allow it to work freely both horizontally and perpendicularly.

The more fully to set forth my invention I will proceed to describe its construction by drawings and by letters of reference.

Figure 1:
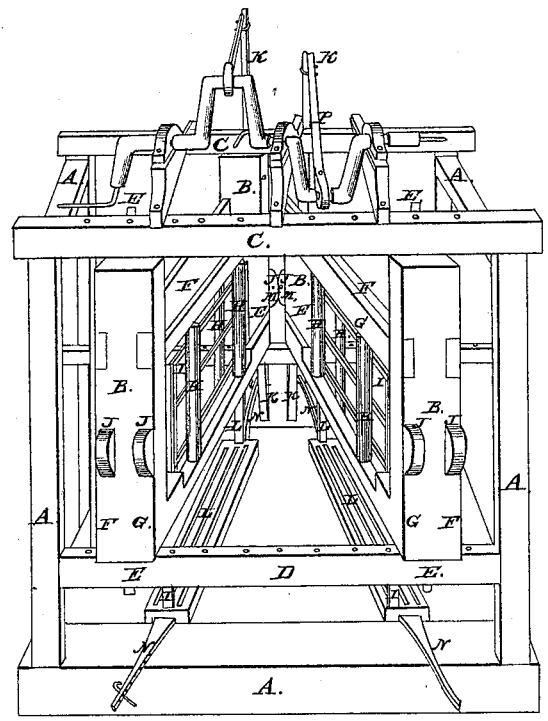
Figure 2:
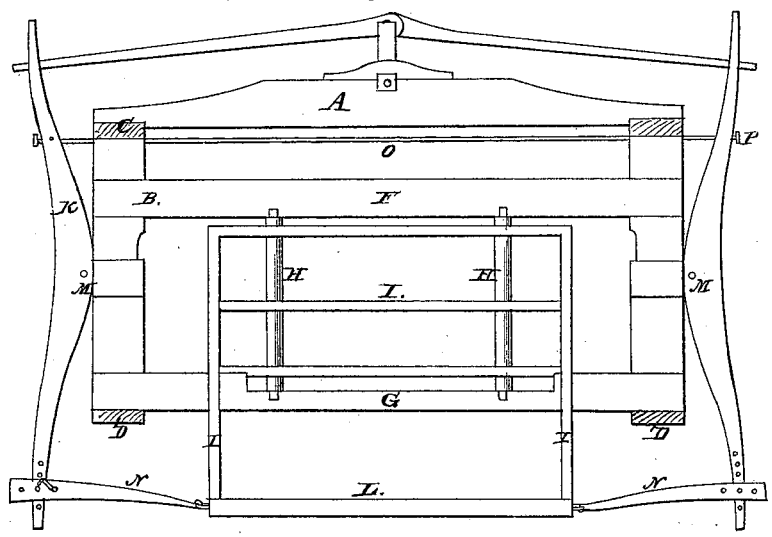

Figure 1 is a perspective elevation of a double gang as constructed in a frame for sawing a block on two sides at once. Fig. 2 is a section view of a saw frame saw sash and the rocking bars showing the construction and connection of the parts.

Let similar letters refer to like parts in both designs.

Then A, will represent the main frame of any desired construction. I secure my saw frame B, B, between the girths C and D, the saw frame being secured by iron rods or bolts E, E, passing through the girth C, and through the end piece B or through brackets fastened to the same and into the girth D, which forms the pivot on which the saw frame moves.

The saw frames B, B, are constructed with double bars F, G between which I set perpendicular guides or rollers H, H. These are to steady and secure the saw sash I, I, in their movements both horizontally and perpendicularly.

L, L, represents the gang of saws in each sash.

On the end pieces of the saw frame B, B, I provide the boxing in which the rocking bars K, K, are secured by the pins M, M, and allowed to rock or vibrate. The upper end of these rocking bars are round to work in a box the lower end may be round or square as most convenient to attach to the connection rods N, N, which connect with the saw sash I, I, so that the power is always transmitted to the saws in the line of their working.

The bolts E E, being removed the saw frame being set at any desired angle, when the bolts may be again inserted to secure the frame or instead of using the bolts the frame may be worked by heavy screws one at each end of the several end pieces B, B, these screws being secured to the post or main frame and connected together shafts or gearing—or instead of bolts or screws there are slugs or keys used for the same purpose.

The rocking bars may be duplicated as in Fig. 2 if deemed necessary either by a connecting rod O attached to the crank or by a connecting rod to pass from one rocking bar to the other O and tightened by a screw nut P the effect of which will be that each rocking bar will draw the saws true in the right direction.

In order to saw pieces longer than ordinary the boxing on the saw frame in which the rocking bars K, K, work may project outward several feet with several holes at proper distances for the pins M, M, by which the rocking bars are secured for the purpose of increasing the distance between the rocking bars, and consequently permitting the use of longer saws.

The saws may extend from one rocking bar to the other while the upper part of the saw sash will be limited to the space in which it can work in the saw frame.

The object of my invention is first to saw two sides of a block of marble or stone on two sides at the same time either straight or at any desired angle and secondly by using a gang of any number of saws at the same time to saw the remainder of the block into slabs of any thickness thereby saving the angular pieces which are in a manner wasted or thirdly to use it in straight work both gangs of saws being set by means of the saw frame to move parallel to saw the whole block into slabs of any desired thickness.

The saws being secure at each end to the rocking bars and guided in the center by means of the rollers could not fail to keep them in a straight line while the saw frame would permit the saws to descend in a perpendicular direction it will execute the work neatly correctly and expeditiously.

What I claim as my invention and desire to secure by Letters Patent is—

The combination of the crank shaft mounted above the saw frame the loosely jointed pitman and the rocking-bars vibrating on fulcra upon the adjustable frames which guide the saws operating substantially and for the purpose above set forth and described.

JAMES MILLER.

In presence of—
 JOSEPH BOCK,
 THEO. B. BURT.